3,130,231
SYNTHESIS OF RUSCOPINE
Benjamin Jaime Frydman, Buenos Aires, Argentina, assignor to Olin Mathieson Chemical Corporation, New York, N.Y., a corporation of Virginia
No Drawing. Filed June 29, 1961, Ser. No. 120,478
2 Claims. (Cl. 260—564)

Ruscopine is a hypotensive agent acting primarily through the ganglionic centers and thus can be used in the treatment of conditions characterized by high blood pressure. This alkaloid has heretofore been obtained in relatively small proportions by extraction from plants of the species *Carduus acanthoides* as disclosed in copending application Serial No. 77,282, filed December 21, 1960. Ruscopine has the empirical formula $C_{16}H_{26}N_4O_2$ and the structural formula

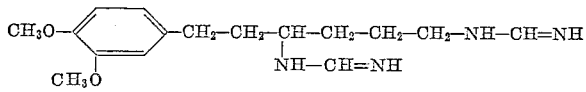
$$CH_3O-\text{<benzene>}-CH_2-CH_2-CH-CH_2-CH_2-CH_2-NH-CH=NH$$
$$\underset{CH_3O}{}\qquad\qquad\overset{|}{NH-CH=NH}$$

It is an object of this invention to produce ruscopine synthetically in larger quantities by more economic methods from simple known compounds by a series of chemical steps.

According to this invention 3-(3,4-dimethoxy-phenyl)-propanol-1 (prepared by reduction of 3,4-dimethoxy-dihydrocinnamic acid [3-(3,4-dimethoxy-phenyl)-propionic acid] with lithium aluminum hydride, and characterized through its 3,5-dinitrobenzoate) is treated with a phosphorus halide such as phosphorous tribromide to produce 1-halo-3-(3,4-dimethoxy-phenyl)-propane. A nitro group is introduced by treatment with a metal nitrite, such as silver nitrite or an alkali metal nitrite preferably the former, to produce 1-nitro-3-(3,4-dimethoxy-phenyl)-propane.

Condensation of this compound with a lower alkyl acrylate such as methyl acrylate gives the lower alkyl ester of racemic 6-(3,4-dimethoxyphenyl)-4-nitrohexanoic acid, which, after purification, is treated with ammonia and the amide of said acid is obtained in crystalline condition. This amide is reduced to oily racemic 1,4-diamino-6-(3,4-dimethoxy-phenyl)-hexane by reaction with lithium aluminum hydride. This compound is the racemic form of a dextro-rotatory base obtained by hydrolysis of ruscopine with alkali and both have the same $Rf$ on paper chromatography. This identity is confirmed by preparation of a crystalline N,N'-dibenzoyl derivative from the racemic synthetic diamine and from the dextro-rotatory natural 1,4-diamino-6-(3,4-dimethoxyphenyl)-hexane, both of which give an identical UV and IR spectra.

When the oily diamino base is treated with a lower alkyl imino ether such as ethyl formi-imidate, the amino groups are transformed into amidines and the racemic form of ruscopine is obtained.

The racemic synthetic ruscopine is isolated as the dihydrochloride with a M.P. 234–235° which, on paper chromatography, gives the same $Rf$ as natural ruscopine and with λ max. 230 mμ (log ε 4.50) and 284 mμ (log ε 4.17), which are the same maxima obtained from natural ruscopine. The infra red spectra are also identical.

The racemic mixtures may be separated into the respective isomers by conventional procedures.

The following examples are illustrative of the invention; all temperatures are given in degrees centigrade.

EXAMPLE 1

*3-(3,4-Dimethoxyphenyl)-Propanol-1*

14 grams of 3-(3,4-dimethoxyphenyl)-propionic acid are dissolved in 300 ml. of absolute ether and the solution added slowly to a well stirred suspension of 5 g. of lithium aluminum hydride in 200 ml. ether. The temperature increases during the addition and the ether boils. Boiling is continued for 3 hours when the remaining lithium aluminum hydride is destroyed and then 200 ml. of 20% sulfuric acid are added, resulting in a clear solution. The ethereal phase is separated and the lower aqueous phase is extracted three times with 400 ml. each of ether. The ethereal extracts are united and evaporated, leaving an oily residue which is treated with 40 ml. of 4 N sodium hydroxide. The resulting solution is extracted three times with 200 ml. of ether each time. The united extracts are evaporated again and the oily residue distilled in vacuum collecting the fraction boiling at 142–145° (0.5 mm.), which is redistilled and collected at 142–143° (0.5 mm.). 8 grams of a colorless oily liquid are obtained, with low solubility in water, soluble in the usual organic solvents. By acidification of the alkaline aqueous liquors, 3 grams of crude 3-(3,4-dimethoxyphenyl)-propionic acid are recovered.

The 3-(3,4-dimethoxyphenyl)-propanol-1 is characterized by transformation into 3,5-dinitrobenzoate by mixing 1 ml. of the alcohol with 2 ml. of pyridine, adding 1 g. of 3,5-dinitrobenzoyl-chloride, heating to dissolution and, when cool, pouring into 10 ml. of ice-water. A precipitate is formed, which, after filtering and recrystallizing from 96% ethanol, is obtained as yellow needles melting at 106–107°.

*Analysis.*—Calculated for $C_{18}H_{18}NO_7$: C, 55.38; H, 4.62; N, 7.17. Found: C, 55.68; H, 3.87; N, 7.14.

EXAMPLE 2

*1-Nitro-3-(3,4-Dimethoxyphenyl)-Propane*

8 grams of the 3-(3,4-dimethoxyphenyl)-propanol-1, prepared according to Example 1, are dissolved in 20 ml. of carbon tetrachloride and the solution cooled to 3–5°. 8 grams of phosphorous tribromide are added, keeping the solution cool. It is then taken out of the ice bath and heated to boiling for 45 minutes. 20 ml. of carbon tetrachloride are added and the solution washed with 5% sodium carbonate and then with water, dried and evaporated in vacuum to obtain an oil which is distilled collecting the fraction boiling at 128° (4 mm.). 4 grams of a colorless oil are obtained, insoluble in water, soluble in the usual organic solvents.

The oil is dissolved in 50 ml. of absolute ether, 4 g. of solid silver nitrite mixed with 4 g. of quartz, both of them finely ground, are added and the mixture and the suspension shaken for two days at room temperature. The solid is then filtered and the ether evaporated, leaving an oily residue which is distilled collecting the fraction boiling 155–160° (2 mm.). This fraction is redistilled and 2.2 grams of boiling point 158° (2 mm.) are collected. The product is an oily, light yellow liquid, insoluble in water, soluble in N sodium hydroxide, the solution taking an orange color. Soluble in the usual organic solvents.

*Analysis.*—Calculated for $C_{11}H_{15}NO_4$: C, 58.65; H, 6.71; N, 6.22. Found: C, 58.71; H, 6.67; N, 6.02.

EXAMPLE 3

*(±)Methyl 6-(3,4-Dimethoxyphenyl)-4-Nitro-Hexanoate*

To 2.2 g. of the nitro compound described in Example 2, 0.3 g. of methyl acrylate are added and then 0.18 g. of triethylamine as catalyst. The resulting solution is left 6 days at 37°. After this time the mixture is distilled and the fraction with a boiling point 180–182° (5 mm.) is collected and redistilled at 130–131° (0.5 mm.) when 500 mg. of a light yellow oil, insoluble in water, soluble in N sodium hydroxide with an orange-yellow color and in the usual organic solvents is obtained.

Analysis.—Calculated for $C_{15}H_{11}NO_6$: N, 4.50. Found: N, 4.40.

EXAMPLE 4

6-(3,4-Dimethoxyphenyl)-4-Nitro-Hexanoamide 1 gram of the nitro ester described in Example 3 is added with stirring to 20 ml. of methanol saturated with ammonia, leaving the mixture for 48 hours at 5°. It is then evaporated to dryness and the solid residue recrystallized several times from ethanol 70%. 200 mg. of white prisms M.P. 38–39° are obtained. With a low solubility in water and ethyl ether, they are more soluble in methanol, ethanol, benzene and chloroform.

Analysis.—Calculated for $C_{14}H_{20}N_2O_5$: C, 56.76; H, 6.75; N, 9.46. Found: C, 56.56; H, 6.75; N, 9.41.

EXAMPLE 5

1,4-Diamino-6-(3,4-Dimethoxyphenyl)-Hexane 200 mg. of the amide described in Example 4 are dissolved in 10 ml. tetrahydrofurane and the solution slowly added to a suspension of one gram of lithium aluminum hydride in 20 ml. of the same solvent. After the addition, the mixture is boiled for 7 hours with good stirring. The excess of lithium aluminum hydride is decomposed by adding 100 ml. of 10% water solution of sodium and potassium tartrate.

The diamine is extracted with ether employing Mayer's reaction to control the extraction. 100 ml. of ether are employed three times for this extraction. The united ethereal extracts are evaporated yielding 100 mg. of a white oil. This oil on paper chromatography with the solvent described below, gives an Rƒ (0.09) identical to that obtained employing the diamine prepared by alkaline hydrolysis of the alkaloid ruscopine from *C. acanthoides*. (For determining the Rƒ, descending chromatography is employed with Whatman No. 1 paper. The normal phase is normal butanol saturated with buffer pH 5.6 (acetic acid-sodium acetate). For development of the chromatogram Dragendorff reagent is employed.)

The diamine is characterized by benzoylation to obtain 1,4 - dibenzoylamino-6-(dimethoxyphenyl)-hexane, the preparation of this compound being carried out in the following way:

The 100 mg. of oily diamine obtained in one of the preparations is dissolved in 1 ml. pyridine and 2 ml. benzene. The solution was cooled to 0–5° and 0.2 ml. of benzoyl chloride added. After the addition the mixture is allowed to reach room temperature and slowly heated to 70° for 30 minutes. 20 ml. of water are then added and the benzene phase is separated and the water solution extracted with benzene several times.

The united benzene extracts are washed with 5% sodium carbonate solution, with water and then well dried and evaporated. The residue is recrystallized several times from ethanol giving 70 mg. of prisms M.P. 134–135° λ max. 284 mμ (log ε 5.17) in ethanol.

The UV spectrum is identical with that given by the dextro-rotatory (+)1,4 - dibenzoylamino-6-(3,4 - dimethoxyphenyl)-hexane prepared by benzoylation of the base obtained by alkaline hydrolysis of the alkaloid ruscopine isolated from *C. acanthoides* which has an M.P. 127–128°.

The infra-red spectrum of the synthetic and the dextrorotatory compound are also identical when taken in a chloroform solution.

EXAMPLE 6

(±) Ruscopine 30 mg. of crude (±) 1,4-diamino-6-(3,4-dimethoxyphenyl)-hexane prepared as described in Example 5 are dissolved in 10 ml. dried ether and treated at room temperature with 10 ml. of an ethereal solution containing the ethyl formi-imidate obtained from 100 mg. of ethyl formi-imidate hydrochloride. The new solution is left for 10 days at ambient temperature and then evaporated to dryness, the residue is dissolved in 0.5 ml. of 96% ethanol and concentrated hydrochloric acid added to pH 2. By cooling the solution to 0° and leaving at this temperature for several hours, crystals of (±) ruscopine hydrochloride precipitate. The hydrochloride is recrystallized from ethanol 96° when needles M.P. 234–235° are finally obtained.

This salt on paper chromatography has Rƒ 0.11, in the same system described in Example 5. It gives a UV spectrum with λ max. 230 mμ (log ε, 4.50); 284 mμ (log ε, 4.17) qualitative and quantitatively identical with the UV-spectrum of the hydrochloride of the natural alkaloid ruscopine prepared from *C. acanthoides* which has an M.P. 249—251° and gives also the same Rƒ on paper chromatography.

What is claimed is:

1. A process for the production of ruscopine which comprises brominating 3 - (3,4 - dimethoxyphenyl) propanol-1, to obtain 1-bromo-3-(3,4-dimethoxyphenyl) propane, reacting the last named compound with a metal nitrite selected from the group consisting of silver nitrite and alkali metal nitrite to obtain 1-nitro-3-(3,4-dimethoxyphenyl)propane, condensing the last named compound with a lower alkyl acrylate to obtain the lower alkyl ester of 6-(3,4-dimethoxyphenyl)-4-nitrohexanoic acid, amidating said acid to obtain 6-(3,4-dimethoxyphenyl)-4-nitrohexanoamide, reducing said amide to obtain 1,4 - diamino - 6 - (3,4-dimethoxyphenyl)hexane and reacting the last named compound with a lower alkyl imino ether to obtain ruscopine.

2. A process for the production of ruscopine which comprises reacting 3-(3,4-dimethoxyphenyl) propanol-1 with phosphorus tribromide to obtain 1-bromo-3-(3,4-dimethoxyphenyl) propane, reacting the last named compound with silver nitrite to obtain 1-nitro-3-(3,4-dimethoxyphenyl)propane, condensing the last named compound with methyl acrylate to obtain the methyl ester of 6-(3,4-dimethoxyphenyl)-4-nitrohexanoic acid, amidating said acid with ammonia to obtain 6-(3,4-dimethoxyphenyl)-4-nitrohexanoamide, reducing said amide with lithium aluminum hydride to obtain 1,4-diamino-6-(3,4-dimethoxyphenyl)hexane and reacting the last named compound with ethyl imino ether to obtain ruscopine.

References Cited in the file of this patent

UNITED STATES PATENTS

| | | |
|---|---|---|
| 2,361,327 | Sparks | Oct. 24, 1944 |
| 2,384,446 | Ashley | Sept. 11, 1945 |
| 2,385,940 | Price et al. | Oct. 2, 1945 |
| 2,390,918 | Bruson | Dec. 11, 1945 |
| 2,534,567 | Baltzly et al. | Dec. 19, 1950 |
| 2,680,762 | Dickson | June 8, 1954 |
| 2,753,376 | Cummins | July 3, 1956 |
| 2,759,976 | Suter | Aug. 21, 1956 |
| 2,791,604 | Blackwood et al. | May 7, 1957 |
| 2,850,534 | Gleim | Sept. 2, 1958 |
| 2,862,034 | Hamlin | Nov. 25, 1958 |
| 2,910,505 | Winthrop | Oct. 27, 1959 |

FOREIGN PATENTS

| | | |
|---|---|---|
| 507,565 | Great Britain | June 12, 1939 |

OTHER REFERENCES

Flory: Principles of Polymer Chemistry, (New York, 1953), pp. 43 and 89.

Adams et al.: "Organic Reactions," vol. VI, pp. 470–506 (1951).

Wagner et al.: "Synthetic Organic Chemistry," pp. 91, 568 and 749 (1953).

Migrdichian: "Organic Synthesis," pp. 404–406 (1957).